US009098996B2

(12) United States Patent
Barraci et al.

(10) Patent No.: US 9,098,996 B2
(45) Date of Patent: Aug. 4, 2015

(54) METHODS AND SYSTEMS FOR INTEGRATING RUNWAY STATUS AND LAYOUT

(75) Inventors: Nima Barraci, Frankfurt am Main (DE); Thorsten Wiesemann, Hofheim (DE); Anja Soell, Basel (CH)

(73) Assignee: The Boeing Company, Chicago, IL (US)

( * ) Notice: Subject to any disclaimer, the term of this patent is extended or adjusted under 35 U.S.C. 154(b) by 223 days.

(21) Appl. No.: 13/270,787

(22) Filed: Oct. 11, 2011

(65) Prior Publication Data

US 2013/0090841 A1 Apr. 11, 2013

(51) Int. Cl.
*G06F 19/00* (2011.01)
*G08G 5/00* (2006.01)
*G08G 5/02* (2006.01)

(52) U.S. Cl.
CPC ............ *G08G 5/0021* (2013.01); *G08G 5/0013* (2013.01); *G08G 5/025* (2013.01)

(58) Field of Classification Search
None
See application file for complete search history.

(56) References Cited

U.S. PATENT DOCUMENTS 5,786,773 A 7/1998 Murphy
6,920,390 B2 7/2005 Mallet et al.
7,216,069 B2 * 5/2007 Hett .................................. 703/6
8,019,529 B1 9/2011 Sharma
8,200,378 B1 * 6/2012 Chiew et al. ...................... 701/4
2006/0241820 A1 * 10/2006 Dwyer et al. ..................... 701/3
2008/0140727 A1 * 6/2008 Pschierer ...................... 707/200
2010/0026525 A1 * 2/2010 Feyereisen et al. ........... 340/972
2010/0125403 A1 5/2010 Clark et al.
2010/0250030 A1 * 9/2010 Nichols et al. .................... 701/7
2011/0087428 A1 4/2011 Barnetche et al.

FOREIGN PATENT DOCUMENTS

EP 2317488 A2 5/2011

OTHER PUBLICATIONS

GeoEye, "GeoEye—Airport Mapping Databases", Sep. 2009.*
Extended European Search Report of Application No. 12183945; Nov. 7, 2013; 8 pages.

* cited by examiner

*Primary Examiner* — Thomas Tarcza
*Assistant Examiner* — Garrett Evans
(74) *Attorney, Agent, or Firm* — Armstrong Teasdale LLP

(57) ABSTRACT

A method for combining static runway information with runway status information for a selected runway is described. The method includes retrieving, with a processing device, static runway information for the selected runway from at least one database, retrieving, with the processing device, runway status information for the selected runway from at least one source of dynamic runway status information, generating, through a program executing on the processing device, a depiction of the selected runway on at least one display device, and generating for display proximate the runway depiction, through the execution of the program, a plurality of contextual symbology associated with the runway, the symbology based on the retrieved static runway information and the retrieved dynamic runway status information.

20 Claims, 8 Drawing Sheets

METHODS AND SYSTEMS FOR INTEGRATING RUNWAY STATUS AND LAYOUT

BACKGROUND

The field of the disclosure relates generally to runway identification, and more specifically, to methods and systems for integrating runway status and layout.

Currently, pilots consult approach charts (electronic or paper) to retrieve the required information on runway layout (e.g. a runway lighting system). The pilots further retrieve runway status information via (D-)ATIS and radio. In addition, a meteorological aviation report system (METARS) provides weather related information and notices to air men systems (NOTAM) provide other relevant and current information related to a runway and/or airport which is being approached. Pilots mentally integrate all of this information with the approach chart information to form a mental picture of the airport and runway condition.

In addition to the taxing mental integration, the current approach methodology also results in problems in the identification of the correct runway when on approach. It is desirable, for example, to prevent a taxiway landing or a landing on a parallel runway. However, there have been no improvements in the easing of the mental tasks of pilots in regard to the deciphering of current state-of-the-art symbology for runway layout depiction.

BRIEF DESCRIPTION

In one aspect, a method for combining static runway information with runway status information for a selected runway is provided. The method includes retrieving, with a processing device, static runway information for the selected runway from at least one database, retrieving, with the processing device, runway status information for the selected runway from at least one source of dynamic runway status information, generating, through a program executing on the processing device, a depiction of the selected runway on at least one display device, and generating for display proximate the runway depiction, through the execution of the program, a plurality of contextual symbology associated with the runway, the symbology based on the retrieved static runway information and the retrieved dynamic runway status information.

In another aspect, a supplemental aeronautical information system is provided that includes a processing device operable to access a database of static runway information, a display device communicatively coupled to the processing device, and at least one communications interface associated with the processing device. The at least one communications interface is operable to receive dynamic runway status information from at least one source of dynamic runway status information. The processing device is programmed to generate data operable to cause the display device to depict a selected runway based on the static runway information and the dynamic runway status information and generate data operable to cause the display device to display, proximate the selected runway depiction, a plurality of contextual symbology associated with the selected runway, the contextual symbology based on the static runway information and the retrieved dynamic runway status information.

In still another aspect, one or more computer-readable storage media having computer-executable instructions embodied thereon are provided. When executed by at least one processor, the computer-executable instructions cause the at least one processor to retrieve static runway information and dynamic runway status information from a plurality of sources, generate a depiction of the selected runway on at least one display device, the depiction based on at least a portion of the static runway information and dynamic runway status information, and generate contextual symbology for display proximate the selected runway depiction, the contextual symbology based on at least a portion of the static runway information and dynamic runway status information.

The features, functions, and advantages that have been discussed can be achieved independently in various embodiments or may be combined in yet other embodiments further details of which can be seen with reference to the following description and drawings.

DETAILED DESCRIPTION

The described embodiments address the problem of identifying the correct runway when on approach, for example, to prevent a taxiway landing or a landing on a parallel runway. The embodiments further ease the mental task to (1) decipher current state-of-the-art symbology for runway layout depiction by integrating the runway status (e.g., inoperable) as retrieved via digital information systems such as digital automatic terminal information service (D-ATIS) with static runway information such as might be found in an airport mapping database, to (2) integrate runway state information (e.g., covered with snow) into the runway depiction and to (3) integrate runway occupancy information as retrieved via e.g. ADS-B. To accomplish the solutions described herein, a system is provided that integrates runway related information that has traditionally been provided in different datasets, providing to a pilot the integrated data in a contextual format.

Figure 1:
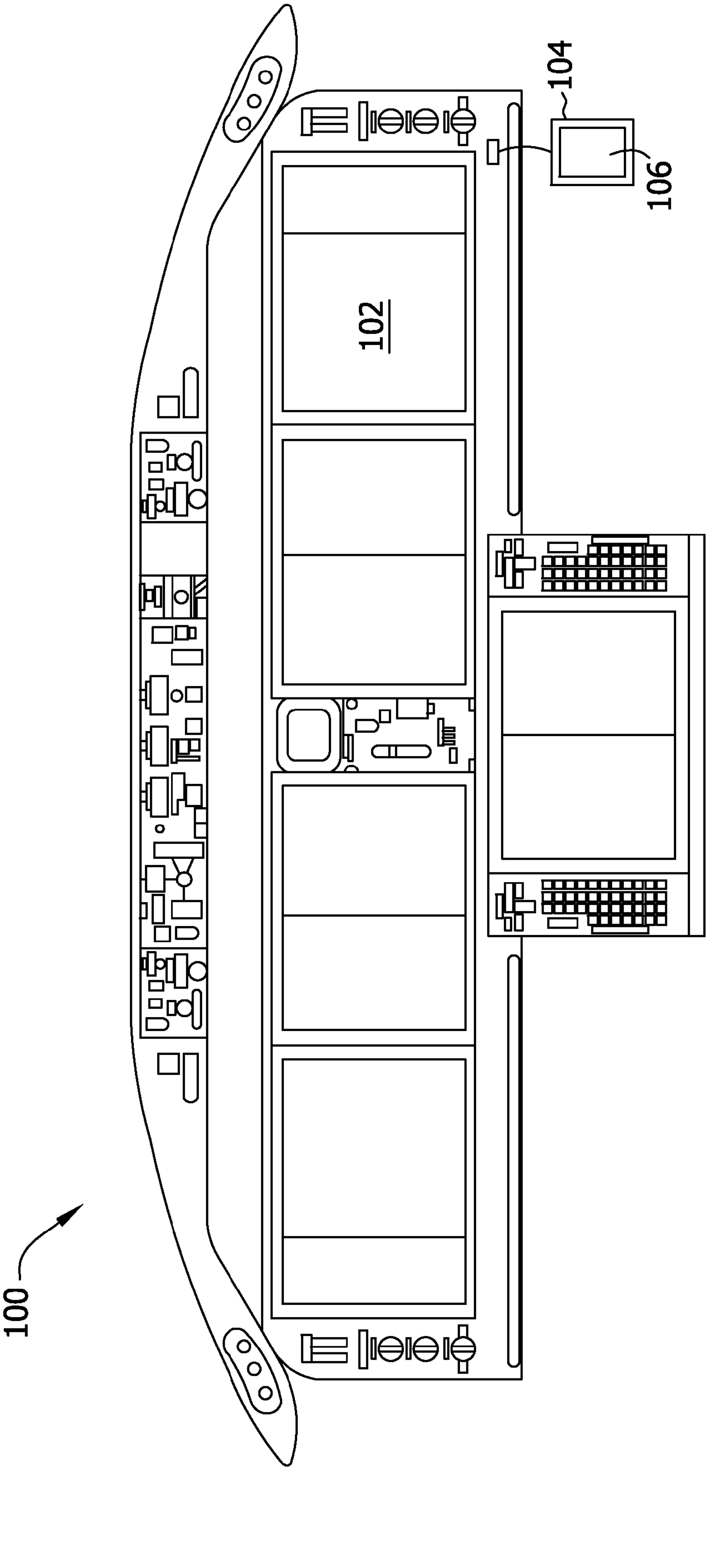
FIG. 1 is a forward perspective view of an exemplary aircraft cockpit display panel.

FIG. 1 is a forward perspective view of an exemplary aircraft cockpit display panel 100 that includes at least one display screen 102 in accordance with an illustrative embodiment. In the illustrative embodiment, display screen is positioned on aircraft cockpit display panel 100. In an alternative embodiment, display screen 102 is positioned on an auxiliary panel (not shown) located in the cockpit of the aircraft. During aircraft operation, display screen 102 is available for viewing by a pilot and/or co-pilot of the aircraft. Display screen 102 may be used to view data included in an electronic flight bag 104, which may be embodied as a standalone device such as, but not limited to a PDA, laptop PC, or portable touchscreen device, or as a software component of a system executing on a processor that is part of a subsystem of the aircraft.

In the exemplary embodiment, the electronic flight bag 104 includes an electronic storage device configured to store various user-configurable flight-related objects for all required and desired information for a particular flight, such as flight routes, as defined by, for example, way-points, airport information, temporary flight restrictions, and weather information as well as any other user-defined objects associated with a flight, ground operations, and/or flight planning. Certain of these include electronic versions of aviation charts and/or navigation charts, sometimes collectively referred to herein as electronic charts. The electronic flight bag 104 may receive data from various aircraft and ground sensors and systems, determines flight information based on the received data in real-time, and display the flight information and/or alerts to the flight crew through display screen 102 and other aural and/or visual indicators positioned on cockpit display panel 100. In the illustrated embodiment, electronic flight bag 104 incorporates a display 106 through which at least a portion of the information described above might be presented. Such flight information provides the flight crew with additional situational awareness during all phases of aircraft operation.

Figure 2:
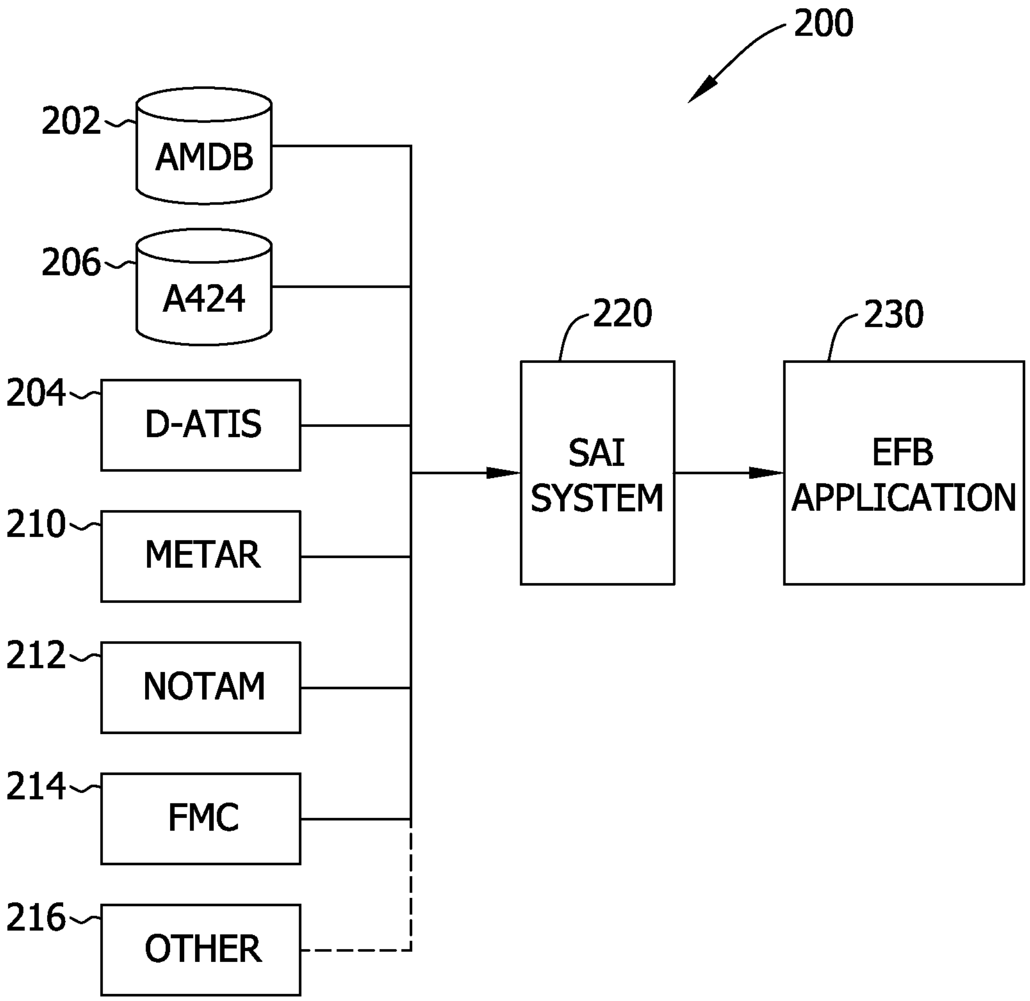
FIG. 2 is a block diagram of a system that integrates runway information from multiple sources for display.

FIG. 2 is a block diagram of a system 200 that integrates, for example, runway layout information from airport mapping databases (AMDB) 202, runway status as retrieved via a digital information system such as D-ATIS 204, and airborne navigation system database data, for example, from a navigation system 206 operating under the ARINC 424 standard for the preparation and transmission of data. As further described, system 200 to provide a situational awareness via an interface to one or more of the display screens 102, 106 described above.

In alternative embodiments, system 200 might further incorporate one or more of a meteorological terminal aviation routine weather report or meteorological aviation report, collectively a METARS system 210. Further embodiments might include a notices to air men (NOTAM) system 212 and/or a flight management controller (FMC) 214. Other systems 216 that provide relevant runway information may be coupled to supplemental aeronautical information (SAI) system 220 in alternative embodiments.

In any configuration, the above described components of system 200 provide data to a supplemental aeronautical information (SAI) system 220, which integrates the data provided by each system component for output onto a display, for example, an electronic flight bag (EFB) display 230, a cockpit display, or a device such as a smart phone or portable touch screen device running an EFB application.

In regard to the components of system 200, the SAI system 220 integrates runway related information from different datasets in order to provide a pilot the best possible information set and a context within which the integrated data may be utilized. The SAI system 220 collects all information to be presented on the EFB display 230. For example, SAI system 220 receives database information such as an airport map database from AMDB 202, including, but not limited to static runway information and an airport layout. The ARINC 424 information from navigation system 206 includes, for example, runway lighting information for a selected runway. Terminal charts may be included within navigation system 206 which provide one or more of runway lighting system information and a descent angle for runway approach. D-ATIS 204 reports runway operational condition for the selected runway (e.g., operational, not operational, only for taxiing, lighting out, runway closed, etc.) and METARS system 210 provides data relating to the current general condition of the selected runway (e.g., dry, wet, covered with slush, covered with snow, icy, etc.) are retrieved.

In embodiments, information may be utilized by the SAI system 220 such as relevant information regarding runway conditions as might be received via the notices to air men (NOTAM) system 212 and/or aircraft relevant information received from flight management controller (FMC) 214. In alternative embodiments, other data may be utilized to provide a more complete runway condition solution and is signified in FIG. 2 as being provided by other systems 216.

Figure 3:
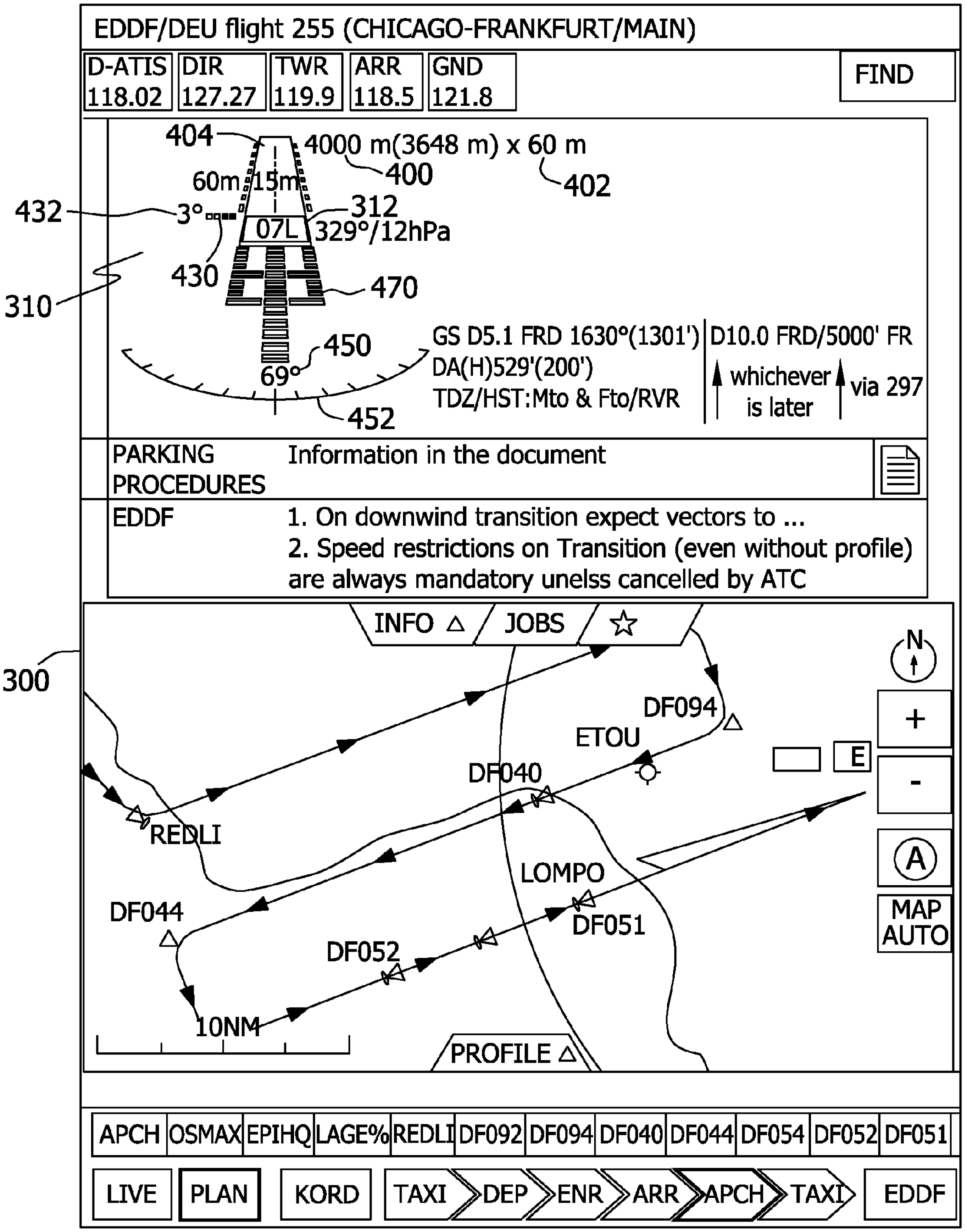
FIG. 3 is a depiction of an approach chart that is modified to include a graphical encoding of runway information.

As shown in FIG. 3, all of the available information from the plurality of runway information sources is integrated by the SAI system 220 to produce a graphical depiction of the runway on a display such as EFB display 230. EFB display 230 may be thought of as a front-end application providing a user interface through which a user, such as a pilot, avails themselves to the information provided by SAI system 220, which is then used by the flight crew to brief themselves on their approach.

More specifically, FIG. 3 is a depiction of an approach chart 300 that is modified to include a graphical encoding of runway information 310. The runway information 310 is depicted as a pilot would see such information when looking out of the front window of the aircraft.

Figure 4:
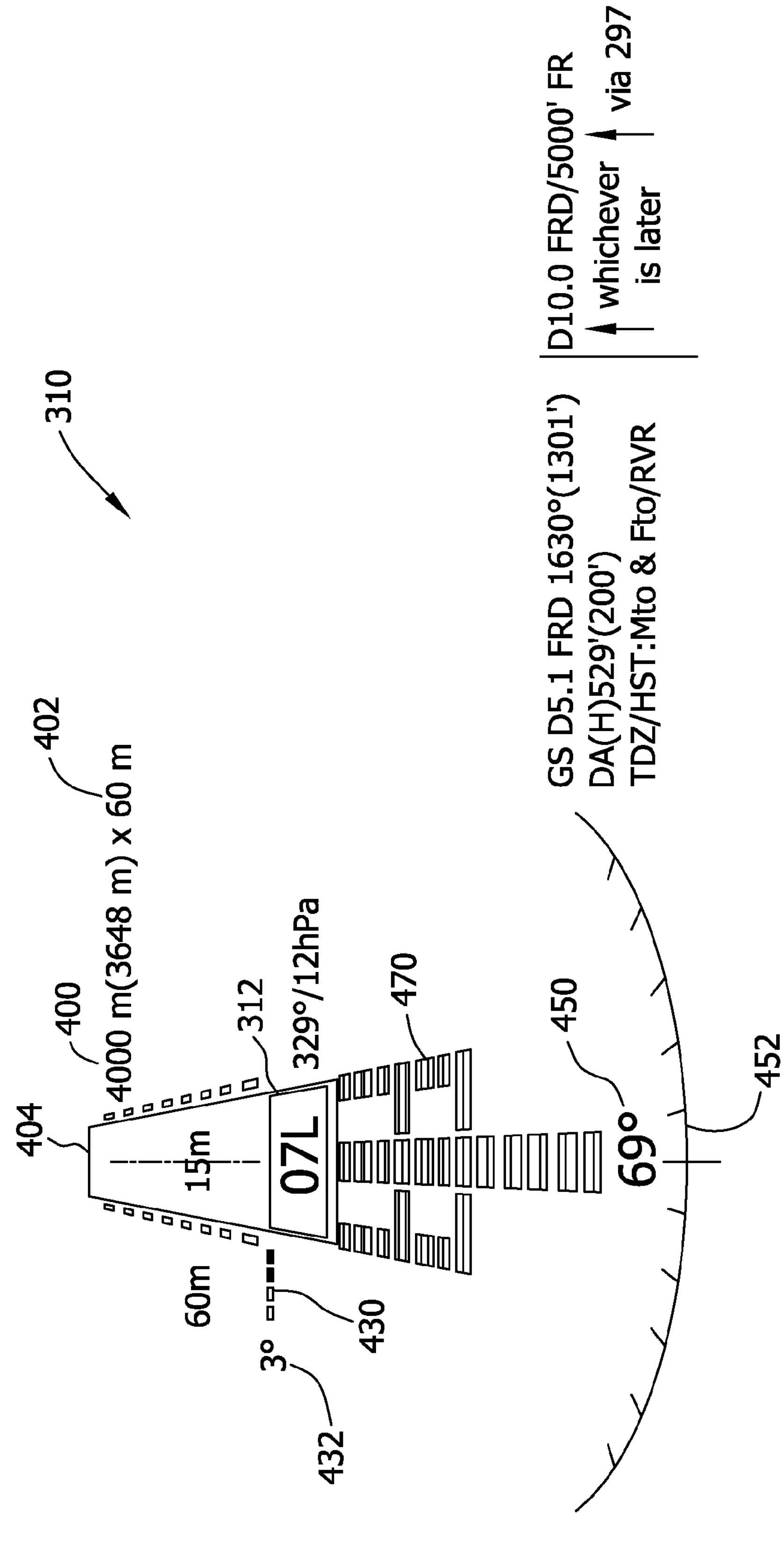
FIG. 4 is an enlarged view of the runway information depicted in FIG. 3.

FIG. 4 is an enlarged view of runway information 310. The runway operational status in respect to ownship is depicted as part of the runway symbology as will be described. In embodiments, the selected runway (07L) for landing is depicted with a label 312 in a color that is different from the labels associated with the other runways. In another embodiment, the runway is depicted in accordance with ambient lighting conditions (e.g., nighttime, daylight, etc.). In such embodiments and for example, the lighting along the sides of the runway is depicted more conspicuously for a nighttime approach then they are for a daytime approach. Such embodiments are controlled, for example, from data received from the FMC 214.

Figure 5:
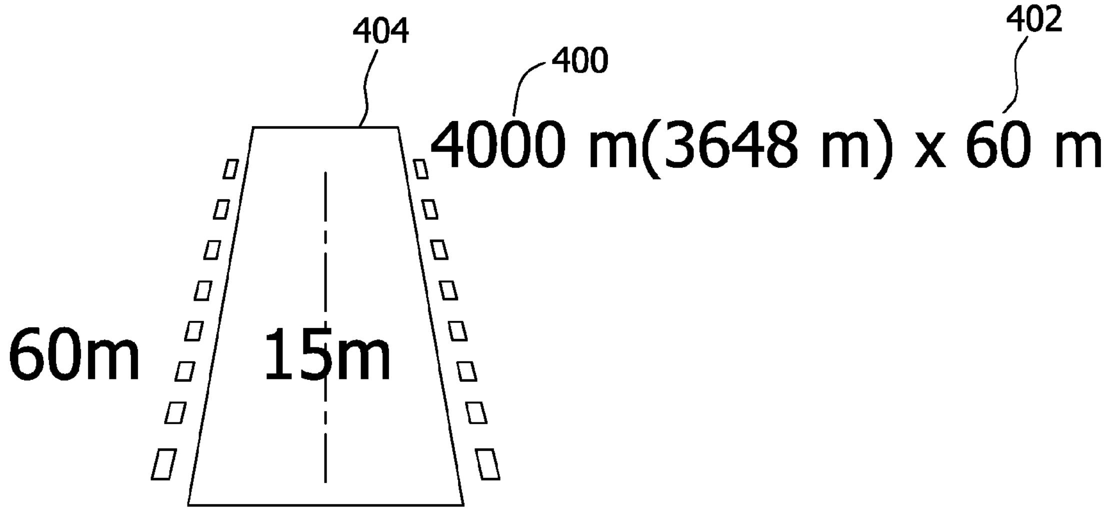
FIG. 5 is a detailed illustration of runway symbology that is included in the runway information of FIG. 3.

As shown in FIG. 5, and referencing runway information 310 in FIG. 4, runway length 400 and width 402 retrieved from the ARINC 424 information within the navigation system 206 are integrated into the overall runway symbology. This information is compared to information retrieved from AMDB 202, and in the case of discrepancies, the more constraining information will be presented to the user. In embodiments, a depiction for a state of the runway 404, which is retrieved from the METARS system 210 is shown by the color in which the runway 404 is depicted. For example, a dry runway 404 might be depicted by gray. Further information such as runway exit information can be retrieved from AMDB 202. In combination with a break-to-vacate system, aircraft mass and runway condition, one embodiment of SAI 220 indicates whether preferred exit is possible or not.

Figure 6:
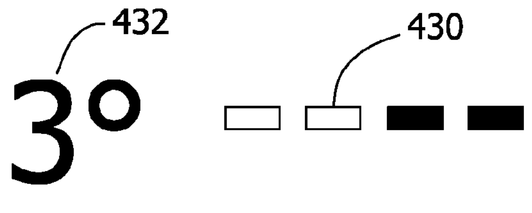
FIG. 6 is a detailed illustration of a precision approach path indicator (PAPI) configuration and glide-slope/descent angle that is included in the runway information of FIG. 3.

As shown in FIG. 6, and again referencing runway information 310 in FIG. 4, a PAPI lighting system configuration 430 and glide-slope/descent angle 432 are retrieved from the ARINC 424 database. As is known by those skilled in the art, a PAPI (precision approach path indicator) provides the pilot with a safe and accurate glide slope on final approach to the runway. A row of PAPI light housing assemblies (LHAs) are placed perpendicular to the approach path to be seen by the pilot in combinations of red and white to indicate a path that is too high, too low or correctly on slope. Based on data received by the aircraft, the PAPI lighting configuration 430 is included in the runway information 310, duplicating the information provided by the ground based PAPI lights.

Figure 7:
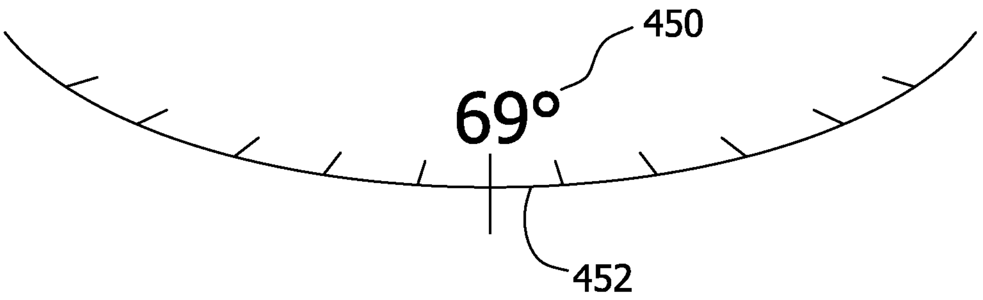
FIG. 7 is a detailed illustration of true heading and partial compass rose which are integrated into the runway information of FIG. 3.

FIG. 7 is a depiction of true heading 450 which is integrated into runway information 310 as a partial depiction of a compass rose.

Figure 8:
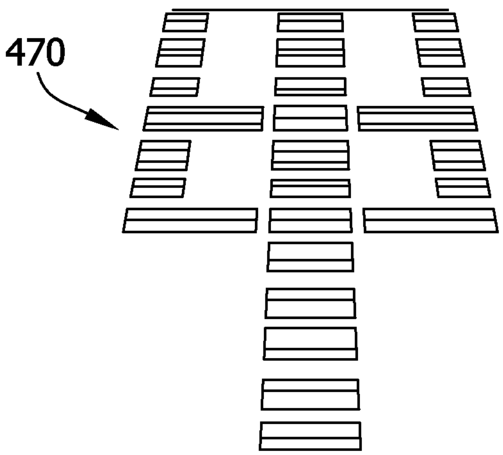
FIG. 8 is a detailed illustration of RLS (Runway Lighting System) information that is included in the runway information of FIG. 3.

FIG. 8 is a depiction of RLS (runway lighting system) information 470 that is retrieved from the ARINC 424 database within navigation system 206 and depicted in the runway information in a way comparable to the outside view presented to a pilot through the window of an aircraft.

Figure 9:
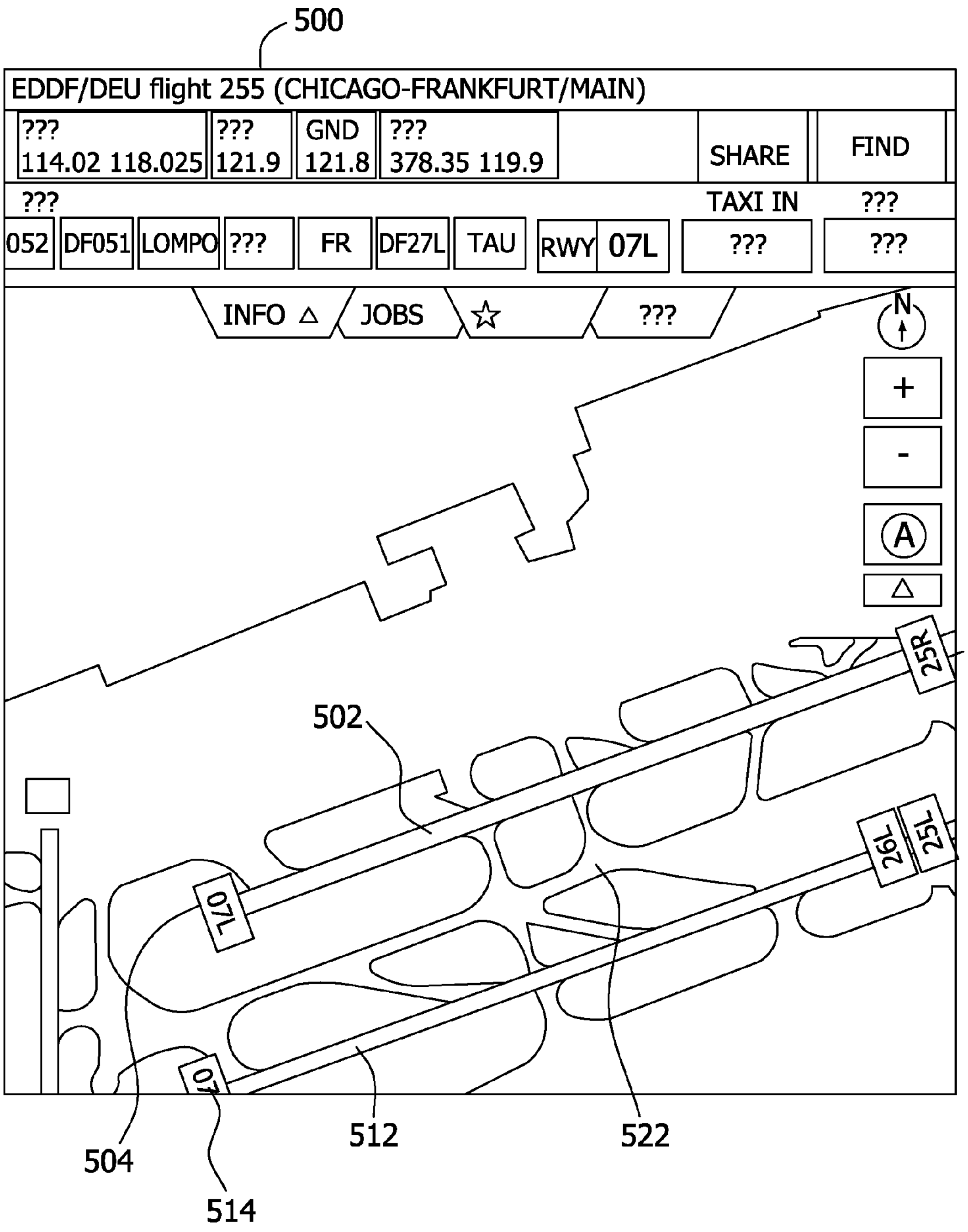
FIG. 9 is an airport map display in which the selected runway and a label for the selected runway, are depicted in colors that are different than those used to depict other runways and labels in the airport map display.

The same depiction concepts as described above are used in other portions of the applications that generate runway related displays, for example, as shown in FIG. 9. FIG. 9 is an airport map display 500 in which the selected runway 502, as well as a label 504 for the runway 502, are depicted in colors that are different from another runway 512 and its associated label 514. A taxiway 522 between runways 502 and 512 is depicted in a third color.

Figure 10:
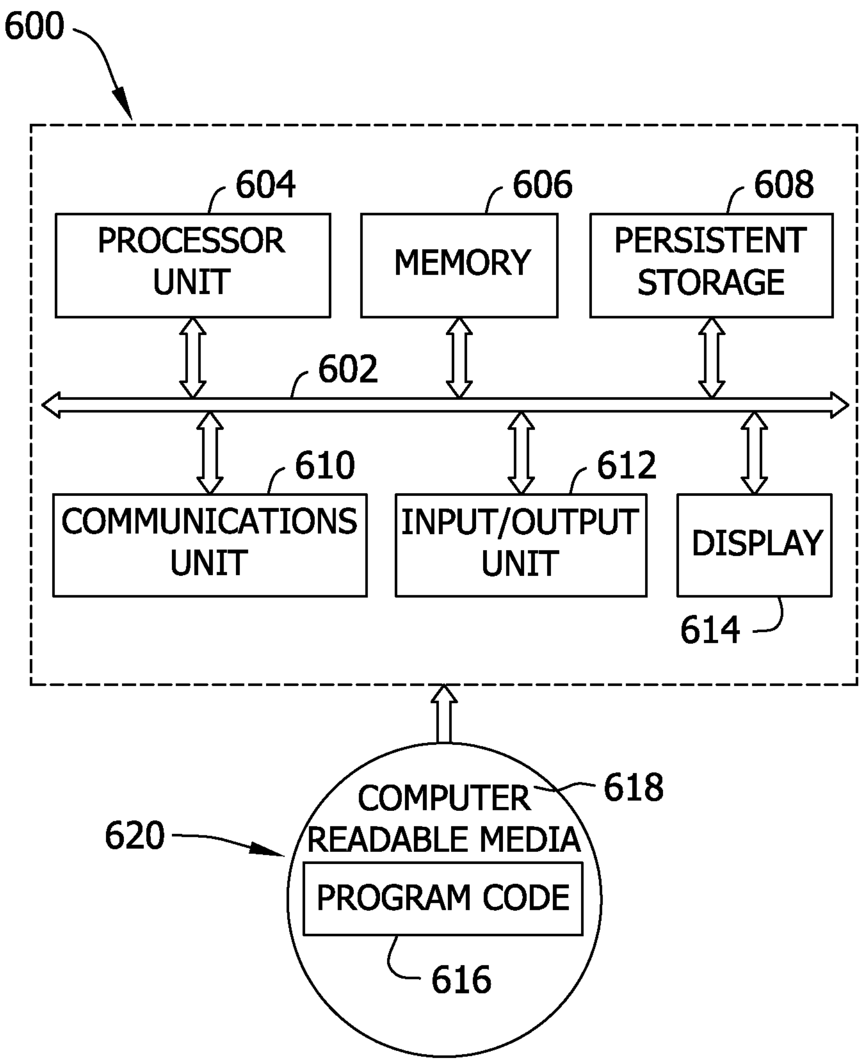
FIG. 10 is a block diagram of one embodiment of a data processing system that might be implanted within the supplemental aeronautical information (SAI) system of FIG. 2.

Turning now to FIG. 10, a diagram of one embodiment of a data processing system 600 that might be implanted within the SAI system of FIG. 2 is depicted in accordance with an illustrative embodiment. In this illustrative example, data processing system 600 includes communications fabric 602, which provides communications between processor unit 604, memory 606, persistent storage 608, communications unit 610, input/output (I/O) unit 612, and display 614.

Processor unit 604 serves to execute instructions for software that may be loaded into memory 606. Processor unit 604 may be a set of one or more processors or may be a multi-processor core, depending on the particular implementation. Further, processor unit 604 may be implemented using one or more heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices. A storage device is any piece of hardware that is capable of storing information either on a temporary basis and/or a permanent basis. Memory 606, in these examples, may be, for example, without limitation, a random access memory or any other suitable volatile or non-volatile storage device. Persistent storage 608 may take various forms depending on the particular implementation. For example, without limitation, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, without limitation, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communication links.

Input/output unit 612 allows for input and output of data with other devices that may be connected to data processing system 600. For example, without limitation, input/output unit 612 may provide a connection for user input through a keyboard and mouse. Further, input/output unit 612 may send output to a printer. Display 614 provides a mechanism to display information to a user.

Instructions for the operating system and applications or programs are located on persistent storage 608. These instructions may be loaded into memory 606 for execution by processor unit 604. The processes of the different embodiments may be performed by processor unit 604 using computer implemented instructions, which may be located in a memory, such as memory 606. These instructions are referred to as program code, computer usable program code, or computer readable program code that may be read and executed by a processor in processor unit 604. The program code in the different embodiments may be embodied on different physical or tangible computer readable media, such as memory 606 or persistent storage 608.

Program code 616 is located in a functional form on computer readable media 618 that is selectively removable and may be loaded onto or transferred to data processing system 600 for execution by processor unit 604. Program code 616 and computer readable media 618 form computer program product 620 in these examples. In one example, computer readable media 618 may be in a tangible form, such as, for example, an optical or magnetic disc that is inserted or placed into a drive or other device that is part of persistent storage 608 for transfer onto a storage device, such as a hard drive that is part of persistent storage 608. In a tangible form, computer readable media 618 also may take the form of a persistent storage, such as a hard drive, a thumb drive, or a flash memory that is connected to data processing system 600. The tangible form of computer readable media 618 is also referred to as computer recordable storage media. In some instances, computer readable media 618 may not be removable.

Alternatively, program code 616 may be transferred to data processing system 600 from computer readable media 618 through a communications link to communications unit 610 and/or through a connection to input/output unit 612. The communications link and/or the connection may be physical or wireless in the illustrative examples. The computer readable media also may take the form of non-tangible media, such as communications links or wireless transmissions containing the program code.

In some illustrative embodiments, program code 616 may be downloaded over a network to persistent storage 608 from another device or data processing system for use within data processing system 600. For instance, program code stored in a computer readable storage medium in a server data processing system may be downloaded over a network from the server to data processing system 600. The data processing system providing program code 616 may be a server computer, a client computer, or some other device capable of storing and transmitting program code 616.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown.

As one example, a storage device in data processing system 600 is any hardware apparatus that may store data. Memory 606, persistent storage 608 and computer readable media 618 are examples of storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 606 or a cache such as that found in an interface and memory controller hub that may be present in communications fabric 602.

In one embodiment, technical effects of the methods, systems, and computer-readable media described herein include at least one of: (a) retrieving static runway information for the selected runway from at least one database, (b) retrieving runway status information for the selected runway from at least one source of dynamic runway status information, (c) generating, though program execution, a depiction of the selected runway on at least one display device, and (d) generating for display proximate the runway depiction, through the execution of the program, a plurality of contextual symbology associated with the runway, the symbology based on the retrieved static runway information and the retrieved dynamic runway status information.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for combining runway map information with runway status information for a selected runway, said method comprising:

retrieving, with a processing device, runway map information for the selected runway from at least one database, the runway map information including runway exit information for the selected runway;

retrieving, with the processing device, runway status information, including runway condition information, for the selected runway from at least one source of runway status information;

generating, by the processing device, exit availability information by determining from a mass of an aircraft approaching the selected runway, the runway exit information, and the runway condition information, whether the aircraft is capable of exiting the selected runway at a predefined location;

generating, through a program executing on the processing device, a depiction of the selected runway on at least one display device; and generating for display proximate the runway depiction, through the execution of the program, a plurality of contextual symbology associated with the runway, the symbology based on the retrieved runway map information and the retrieved runway status information, the contextual symbology including the exit availability information.

2. The method according to claim 1 wherein, the selected runway is a first runway and generating a depiction of the selected runway comprises depicting the first runway and a first indicator for the first runway in first colors that are different than second colors used to depict at least one second runway and at least one second indicator for the at least one second runway.

3. The method according to claim 1 wherein generating a depiction of the selected runway comprises depicting the selected runway in a color based on data relating to a current general condition of the selected runway received within at least one of a meteorological terminal aviation routine weather report or a meteorological aviation report.

4. The method according to claim 1 wherein generating for display proximate the runway depiction a plurality of contextual symbology comprises displaying dimensions of the selected runway proximate the depiction of the selected runway.

5. The method according to claim 1 wherein generating for display proximate the runway depiction a plurality of contextual symbology comprises depicting a current PAPI lighting configuration and displaying a glide slope angle for the selected runway proximate the depiction of the selected runway.

6. The method according to claim 1 wherein generating for display proximate the runway depiction a plurality of contextual symbology comprises displaying a true heading angle and a portion of a compass rose proximate the depiction of the selected runway.

7. The method according to claim 1 wherein generating for display proximate the runway depiction a plurality of contextual symbology comprises depicting a runway lighting system proximate the depiction of the selected runway as the runway lighting system would be viewed with respect to the runway through a window of the aircraft.

8. The method according to claim 1 wherein retrieving runway status information for the selected runway comprises retrieving runway status information from a plurality of a digital automatic terminal information service, a navigation system providing airport and runway data under ARINC 424, one or more of a meteorological terminal aviation routine weather report or meteorological aviation report, a notices to air men (NOTAM) system, and a flight management controller.

9. The method according to claim 1 wherein retrieving runway map information for the selected runway comprises retrieving runway map information from an airport mapping database.

10. The method according to claim 1 wherein generating a depiction of the selected runway comprises depicting the selected runway on at least one of an electronic display of an approach chart and an electronic display of an airport map.

11. A supplemental aeronautical information system comprising:

a processing device operable to access a database of runway map information including runway exit information for a selected runway;

a display device communicatively coupled to said processing device; and at least one communications interface associated with said processing device, said at least one communications interface operable to receive runway status information, including runway condition information, from at least one source of runway status information, said processing device programmed to:

generate exit availability information by determining from a mass of an aircraft approaching the selected runway, the runway exit information, and the runway condition information, whether the aircraft is capable of exiting the selected runway at a predefined location;

generate data operable to cause said display device to depict the selected runway based on the runway map information and the runway status information; and generate data operable to cause said display device to display, proximate the selected runway depiction, a plurality of contextual symbology associated with the selected runway, the contextual symbology based on the runway map information and the retrieved runway status information, the contextual symbology including the exit availability information.

12. The supplemental aeronautical information system according to claim 11 wherein the selected runway is a first runway and to generate data operable to cause said display device to depict the selected runway said processing device is programmed to depict the first runway and a first indicator for the first runway in first colors that are different than second colors used to depict at least one second runway and at least one second indicator for the at least one second runway in the depiction.

13. The supplemental aeronautical information system according to claim 11 wherein to generate data operable to cause said display device to depict a selected runway said processing device is programmed to depict the selected runway in a color based on data relating to a current general condition of the selected runway received within at least one of a meteorological terminal aviation routine weather report or a meteorological aviation report.

14. The supplemental aeronautical information system according to claim 11 wherein to generate data operable to cause said display device to display a plurality of contextual symbology, said processing device is programmed to display the dimensions of the selected runway proximate the depiction of the selected runway.

15. The supplemental aeronautical information system according to claim 11 wherein to generate data operable to cause said display device to display a plurality of contextual symbology, said processing device is programmed to depict a current precision approach path indicator (PAPI) lighting configuration and display a glide slope angle for the selected runway proximate the depiction of the selected runway.

16. The supplemental aeronautical information system according to claim 11 wherein to generate data operable to cause said display device to display a plurality of contextual symbology, said processing device is programmed to display a true heading angle and a portion of a compass rose proximate the depiction of the selected runway.

17. The supplemental aeronautical information system according to claim 11 wherein to generate data operable to cause said display device to display a plurality of contextual symbology, said processing device is programmed to depict a radar landing system proximate the depiction of the selected runway as the radar landing system would be viewed with respect to the runway through a window of the aircraft.

18. The supplemental aeronautical information system according to claim 11 wherein said at least one communications interface is communicatively coupled to receive runway status information originating from a plurality of a digital automatic terminal information service, a navigation system providing airport and runway data under ARINC 424, one or more of a meteorological terminal aviation routine weather report or meteorological aviation report, a notices to air men (NOTAM) system, and a flight management controller.

19. The supplemental aeronautical information system according to claim 11 wherein to generate data operable to cause said display device to depict a selected runway and display a plurality of contextual symbology associated with the selected runway, said processing device is programmed to depict the selected runway and display the plurality of contextual symbology on at least one of an electronic display of an approach chart and an electronic display of an airport map.

20. One or more non-transitory computer-readable storage media having computer-executable instructions embodied thereon, wherein when executed by at least one processor, the computer-executable instructions cause the at least one processor to:

retrieve runway map information and runway status information from a plurality of sources, the runway map information including runway exit information for a selected runway and the runway status information including runway condition information for the selected runway;

generate exit availability information by determining from a mass of an aircraft approaching the selected runway, the runway exit information, and the runway condition information, whether the aircraft is capable of exiting the selected runway at a predefined location;

generate a depiction of the selected runway on at least one display device, the depiction based on at least a portion of the runway map information and runway status information; and generate contextual symbology for display proximate the selected runway depiction, the contextual symbology based on at least a portion of the runway map information and runway status information, the contextual symbology including the exit availability information.

* * * * *